United States Patent [19]

Lapeyre

[11] E Re. 29,033

[45] Reissued Nov. 9, 1976

[54] ALPHANUMERIC DISPLAY SYSTEM

[75] Inventor: James M. Lapeyre, New Orleans, La.

[73] Assignee: Digicourse, Inc., New Orleans, La.

[22] Filed: Aug. 25, 1975

[21] Appl. No.: 607,569

Related U.S. Patent Documents

Reissue of:

[64] Patent No.: 3,872,463
Issued: Mar. 18, 1975
Appl. No.: 425,499
Filed: Dec. 17, 1973

U.S. Applications:

[63] Continuation of Ser. No. 244,425, April 17, 1972, abandoned.

[52] U.S. Cl. ..... 340/336; 340/324 M; 178/30

[51] Int. Cl.[2] ..... G09F 9/32

[58] Field of Search ..... 340/336, 324 R, 324 M; 40/280; 178/30

[56] References Cited

UNITED STATES PATENTS

| | | | |
|---|---|---|---|
| 3,076,187 | 1/1963 | Bichell | 340/336 |
| 3,368,290 | 2/1968 | Loeb | 340/336 |
| 3,629,655 | 12/1971 | Fullmer | 340/336 |
| 3,644,922 | 2/1972 | James et al. | 340/336 |

*Primary Examiner*—Marshall M. Curtis
*Attorney, Agent, or Firm*—Schiller & Pandiscio

[57] ABSTRACT

An alphanumeric display system including an array of sixteen electrically energizable, light-emitting elements capable, when selectively energized, of forming legibly all numerals and a substantial number of upper and lower case alphabet letters and/or mathematical and punctuation symbols. A similar array is disclosed having a maximum of twenty four light-emitting elements and capable of providing all numerals, upper and lower case alphabet letters and a majority of the symbols employed for punctuation and in mathematics. Both of the arrays disclosed are characterized by arrangement of the light-emitting elements in closely nested relation to form horizontal rows and columns inclined to the right and left at 60° with respect to the horizontal. A solid state system including light-emitting diodes and switching transistors is disclosed.

15 Claims, 4 Drawing Figures

FIG. 1
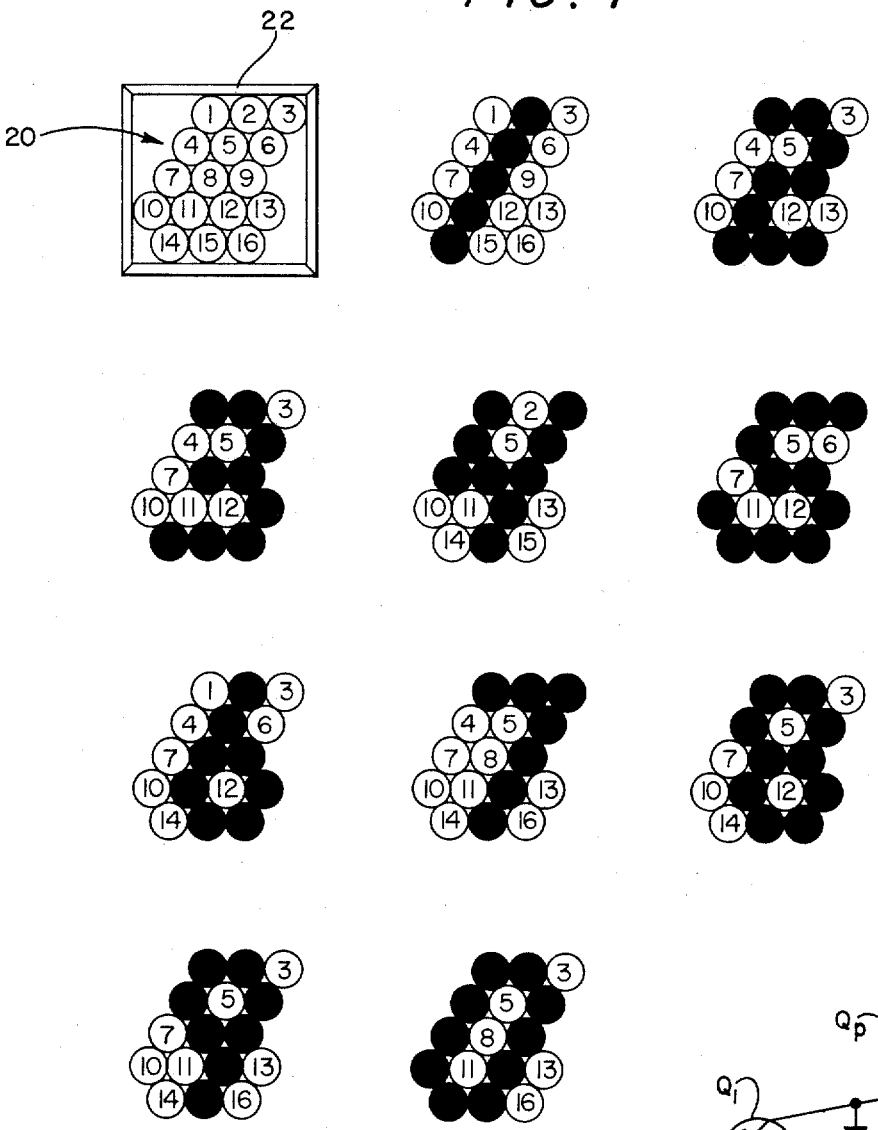
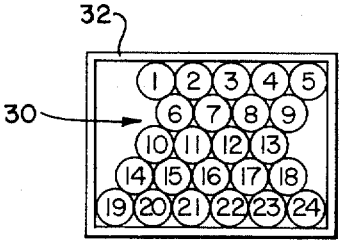
FIG. 2
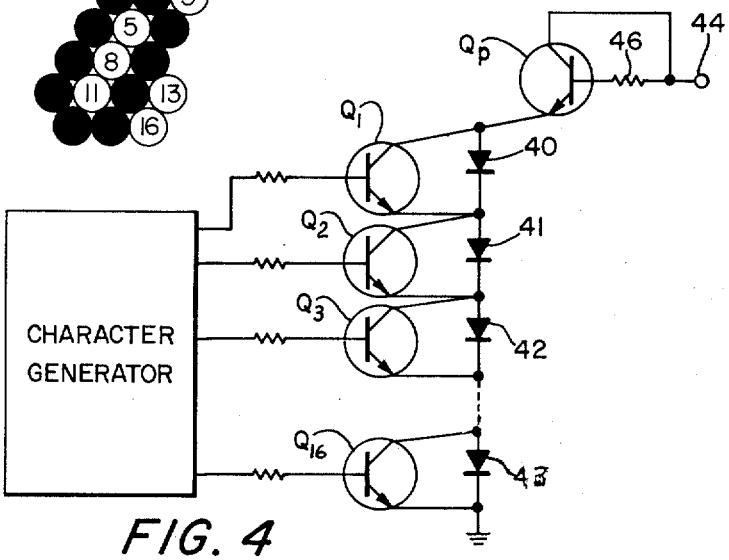
FIG. 4

ALPHANUMERIC DISPLAY SYSTEM

Matter enclosed in heavy brackets [ ] appears in the original patent but forms no part of this reissue specification; matter printed in italics indicates the additions made by reissue.

ALPHANUMERIC DISPLAY SYSTEM

This application is a continuation application of Ser. No. 244,425 filed Apr. 17, 1972, now abandoned.

Alphanumeric display systems of the type with which the present invention is concerned generally comprise an array or raster of light-emitting elements which can be individually activated or deactivated, or otherwise made visible selectively to form numerals, alphabet letters and/or other symbols such as used in mathematics, punctuation or the like. The light-emitting elements are usually of an electrically energized type including, for example, conventional lamps such as incandescent, gaseous discharge, etc., and solid state devices such as light-emitting diodes, the latter being preferable in relatively small displays and/or in embodiments wherein energizing current is to be minimized. Display systems of this type are finding increasing numbers of applications as readout devices on many different types of apparatus such as measuring instruments, recorders, computors and the like, that are electrically operated and where a clearly legible display with rapid response is desirable.

Typically, a widely used system is the seven-segment display in which seven elongated elements or bars are arranged to form two squares sharing a common side. The selective energization of light-emitting element forming or activating the bars will provide recognizable displays of all of the arabic numerals. However, the seven-segment displays cannot duplicate all of the alphabetical characters. Other typical display systems having a relatively large number of light-emitters yet limited alphanumeric, mathematic and punctuation character capability include arrays of thirty-five dots arranged in five columns and seven rows; and a display of sixteen bars arranged to form four squares each sharing two common sides, and four diagonals one in each square, arranged to form an X.

Objects of the invention are: to provide a display system of the type described comprising a novel array or matrix consisting of the fewest number of individual light-emitting elements (which appear as dots), capable of forming the largest number of alphanumeric characters and mathematic and punctuation symbols; to provide arrays of the type described capable of forming all numerals and depending upon the number of dots, a substantially large number of all upper and lower case alphabet letters, and most symbols used in mathematics and punctuation; and to provide an array of light-emitting elements as described capable of forming numerals, letters and symbols that are clearly legible and aesthetically pleasing. The object of forming all numerals and a substantially large number of alphabet, mathematic and punctuation characters is realized by providing a novel array containing only sixteen closely nested, individual light-emitting elements specially arranged in five horizontal rows and four plural-element columns inclined to the right as seen by the viewer. Complete upper and lower case alphabet plus substantially greater mathematic and punctuation capability is achieved by providing an array comprising a maximum of twenty-four elements similarly arranged to form five horizontal rows and five plural element columns inclined to the right.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a further understanding of the nature and objects of the invention, reference should be had to the following detailed description taken in connection with the accompanying drawings wherein:

FIG. 1 is a plan view that shows diagramatically a plurality of arrays of sixteen light-emitting elements arranged in accordance with the invention and illustrating how selective energization produces numerals 0–9,

FIG. 2 is a plan view of a twenty-four element array arranged in accordance with the invention;

FIG. 4 is a schematic diagram of a solid state alphanumeric display system including means for energizing selected light-emitting elements.

Figure 3:
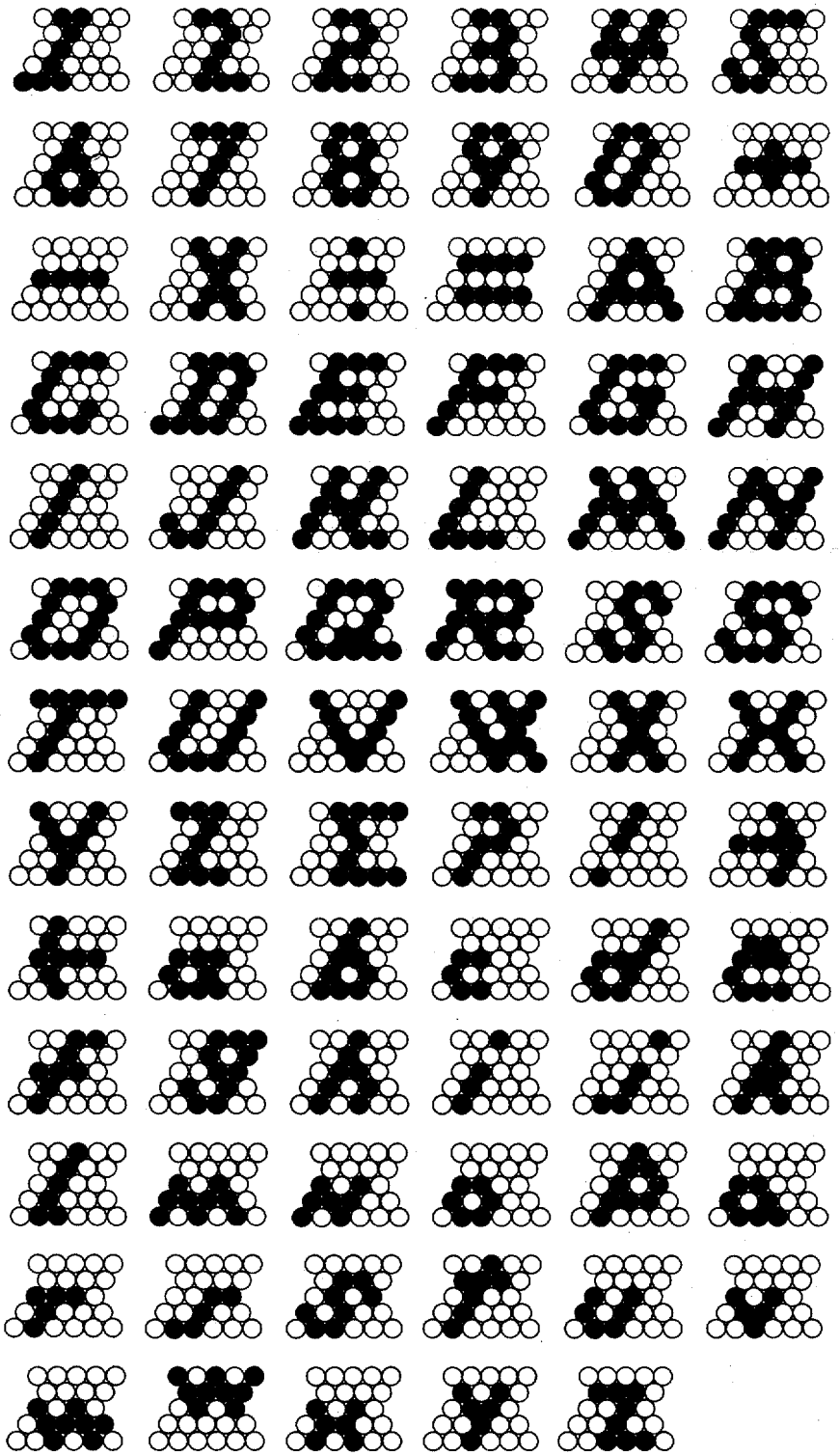
FIG. 3 is a view, similar to FIG. 1, illustrating the formation of all numerals, upper and lower case alphabet letters and various mathematical and punctuation symbols employing the twenty-four dot arrangement of FIG. 2.

Reference is now made to FIG. 1 of the drawings wherein there is illustrated one embodiment of an array, designated 20, of light-emitting elements arranged in accordance with the invention. Each light-emitting element is shown as a circle or circular dot although other geometric shapes, particularly hexagons or ovals, may be employed so long as they provide for close nesting of the individual elements. According to the invention, each alphanumeric array is formed of sixteen light-emitting elements supported in means such as frame 22 and arranged, as seen by the viewer, in five horizontal rows each containing three or four elements. In the form shown in FIG. 1, the three upper rows and the bottom row of array 20 each contain three elements and the other (next to the bottom) row contains four elements. The elements are arranged in closely nested relation similar to a mosaic composed of contiguous hexagons so as to form plural-element columns inclined, as seen by the viewer at about 60° to the right and left relative to the horizontal rows. This will mean that some letters, numbers and symbols, particularly those with long components that are normally vertical such as numerals 1 and 0, upper case letters such as D, E, F, I, etc., and many lower case letters such as b, d, f, h, i, t, etc., will appear inclined to the right which is both pleasing in appearance and consistant with accepted practice such as cursive writing.

The arrangement of the rows is such that there are four plural element columns inclined to the right each containing in order from left to right, four, five, five and two elements respectively; and five plural element columns inclined to the left containing (from left to right) two, three, four and two elements respectively. Array 20 is capable of generating all of the numerals as illustrated plus a large number of upper and lower case alphabet characters, mathematical and punctuation symbols. If the elements are numbered consecutively from 1 to 16 as shown beginning at the left end of each row and working from top to bottom, then all of the numerals can be formed by energizing selected ones of the light-emitting elements. For example, the numeral 1 is formed by energizing elements numbered 2, 5, 8, 11 and 14, or elements 3, 6, 9, 12 and 15; numeral 3 by elements numbered 1, 2, 6, 8, 9 and 13 through 16; and numeral 4 by elements numbered 1, 3, 4, 6, 7 through 9, 12 and 15.

Another embodiment composed of a maximum of 24 light-emitting elements arranged in closely nested relation in horizontal rows and columns slanted or inclined as in FIG. 1, is illustrated in FIGS. 2 and 3. The arrangement of the array 30, which may be enclosed in a frame 32, is composed of five rows including, from top to bottom, five, four, four, five and six elements each to form five multi-element columns inclined, as seen by the viewer at about 60° to the right and left relative to the horizontal rows. The columns, in order from left to right, include four five-element columns and one two-element column. The first and last columns comprise single elements.

With the embodiment of FIGS. 2 and 3, it is possible as shown to form all of the numerals, upper and lower case letters, and various mathematical and punctuation symbols. Furthermore, alternative ways of forming selected characters are available as, for example, numerals 1 and 2 (illustrated) and the letters A, B, E, V, (illustrated), X (illustrated), a, b, e and w (illustrated). All of the letters, numerals and symbols formed are easily recognizable and for the most part, correspond very closely in form and basic appearance to the commonly accepted form and appearance of the particular letter, number or symbol.

For example, numbering the elements of array 30 from 1 to 24 consecutively from left to right and commencing with the top row, one can readily identify the selected elements which form each letter or numeral. For example, to form the numeral two, one energizes (see FIG. 3) elements 2, 3, 8, 12, 16 and 21 through 23. To form a lower case j, one energizes elements 4, 12, 16, 20 and 21. To form a lower case s, one energizes elements 7, 8, 11, 14, 20 and 21. To form an upper case E one simply energizes elements 2–4, 6, 10–12, 14 and 19–21. Other combinations will be clearly apparent to yield other alphanumeric characters.

The alphanumeric display array of light-emitting elements of the invention is particularly adapted for use as a rapid response readout for electrically operated devices such as measuring instruments, recorders, computers or indicators. In applications in which factors such as minimum size, low power requirements and rapid response are particularly desirable, the light-emitting elements may be light-emitting diodes. FIG. 4 shows an example of a solid state circuit for exciting a 16 light-emitting diode array (only four of the 16 diodes being shown) and including switching means for controlling the energization of selected light-emitting diodes. Light-emitting diodes are desirable as light sources because of their small size which enables the formation of arrays measuring a small fraction of an inch and because such diodes have a fast response and require only small operating currents in the order of milliamperes. In the system show, light-emitting diodes 40, 41, 42 and 43 are connected in series with one another and to the emitter of transistor $Q_p$ which serves as a constant current supply. The collector of the latter is connected to a terminal 44 at which a suitable voltage is applied, and its base is connected to the collector through resistor 46. Switching of each diode as required for a particular symbol or character is achieved by connecting across each diode a transistor which when turned on, functions as a shunt for turning off the particular light-emitting diode.

The collector-emitter circuits of transistors designated $Q_1$, $Q_2$, $Q_3$, . . . $Q_{16}$ are connected, respectively, across light-emitting diodes 40, 41, 42, . . . 43 and bases of the transistors are coupled to character generators such as a group of current sources activated manually, or by computer, or in accordance with the output of an encoder or decoder which will provide the requisite character signals. The character generator provides signals that serve to turn on the transistors controlling those diodes that are not required for a specific character display. Thus, for example, when employing the array shown in FIG. 1, the numeral 4 is formed when light-emitting diodes corresponding to elements 1, 3, 4, 6, 7–9, 12 and 15 are activated and the transistors controlling the other elements are turned on thereby preventing energization of the corresponding remaining diodes.

While the circuitry shown is designed to produce a static display, it will be apparent that other circuitry may be employed, the design of which is known and within the skill of the art, for producing not only static displays, but strobed dynamic displays in which the emitter (LED's) are energized in rapid sequence. Dynamic strobing may have advantages in a number of applications, particularly in simplifying the interfacing of the display with a computer.

It will be apparent from the foregoing that the particular array of 16 or 24 nested, light-emitting elements provides for the formation of a maximum number of easily legible and aesthetically pleasing alphanumeric characters as well as a multiplicity of symbols employed in punctuation, mathematics and the like. These arrays have the advantages of versatility combined, if desired, with small size, rapid response and low power requirements. A plurality of the arrays can be arranged in adjacent relation to provide for a visual display of multiple digit numbers, words, multiple word messages, mathematical and chemical equations, and the like, while the individual arrays can be of varying sizes as required and/or need be disposed only at locations where characters are required for a multi-character display. For example, where letters and numbers are employed together with numerical subscripts or superscripts as in chemical or mathematical formulae, both 16 and 24 element arrays can be employed to advantage in the same group.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An alphanumeric display system comprising in combination:

an array of at least 16 electrically energizable, light-emitting elements *being energizable in selected combinations to form numerals, letters and other symbols;* [and means for energizing selected combinations of said elements to form numerals, letters and other symbols;]

said array consisting of four horizontal rows each including at least three of said elements and one row including at least four of said elements, all arranged in nested relation so as to form plural element columns inclined with respect to said horizontal rows at an angle of about 60° both to the right and to the left as seen by the viewer.

2. A display system as defined in claim 1 wherein said four-element row is the row next above the bottom row of the array.

3. A display system as defined in claim 1 including a maximum of sixteen of said elements.

4. A display system as defined in claim 1 wherein said rows are arranged to form in order from left to right, a four-element column, two five-element columns and a two element column, all inclined to the right.

5. A display system as defined in claim 1 wherein each of said elements is substantially circular and is tangent to all adjacent elements.

6. A display system as defined in claim 1 wherein each of said elements is substantially hexagonal and is in contiguous relation with all adjacent elements.

7. A display system as defined in claim 1 including a maximum of 24 of said elements.

8. A display system as defined in claim 1 wherein said rows each include, from top to bottom, five, four, four, five and six of said elements.

9. A display system as defined in claim 8 including, from left to right, four right-inclined columns of five elements each and one column of two elements.

10. In an alphanumeric display system, a closely nested array of at least 16 light-emitting elements consisting of five horizontal rows of at least three or four elements and at least four plural-element columns inclined with respect to said horizontal rows at an angle of about 60° to the right as seen by the viewer including in order from left to right, at least one four-element column, two five-element columns and a two-element column.

11. An array of light-emitting elements as defined in claim 10 including a maximum of 16 of said elements.

12. An array of light-emitting elements as defined in claim 10 wherein four of said rows include at least three of said elements and one of said rows includes at least four of said elements.

13. An array of light-emitting elements as defined in claim 10 wherein said elements are arranged in four plural-element columns inclined to the right, said columns each including, from left to right, four, five, five and two of said elements.

14. An array of light-emitting elements as defined in claim 10 including a maximum of 24 of said elements.

*15. A display system as defined in claim 1 further including means for energizing selected combinations of said elements to form numerals, letters and other symbols.*

* * * * *